(12) United States Patent
Fan

(10) Patent No.: US 8,304,495 B1
(45) Date of Patent: Nov. 6, 2012

(54) ARTICLES COMPRISING POLYESTER AND ETHYLENE COPOLYMER

(75) Inventor: Xiyun Serene Fan, Newark, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 146 days.

(21) Appl. No.: 12/572,612

(22) Filed: Oct. 2, 2009

Related U.S. Application Data

(63) Continuation-in-part of application No. 11/698,434, filed on Jan. 26, 2007, now abandoned.

(60) Provisional application No. 60/764,153, filed on Feb. 1, 2006.

(51) Int. Cl.
*C08L 67/02* (2006.01)

(52) U.S. Cl. ........ 525/166; 525/165; 525/176; 525/437; 525/445; 428/35.7; 428/36.8; 428/480

(58) Field of Classification Search ............... 525/176, 525/165, 166, 437, 445; 428/35.7, 36.8, 428/480
See application file for complete search history.

(56) References Cited

U.S. PATENT DOCUMENTS

| | | | | |
|---|---|---|---|---|
| 4,753,980 | A * | 6/1988 | Deyrup | 524/369 |
| 5,618,881 | A | 4/1997 | Hojabr | |
| 5,820,780 | A | 10/1998 | Furuta | |
| 6,020,414 | A | 2/2000 | Nelsen | |
| 7,388,067 | B2 * | 6/2008 | Leemans et al. | 528/301 |
| 2001/0012557 | A1 | 8/2001 | Ellery | |
| 2007/0179246 | A1 * | 8/2007 | Fan | 525/165 |

FOREIGN PATENT DOCUMENTS

| | | | |
|---|---|---|---|
| DE | 2358843 | A | 8/1993 |
| EP | 1298172 | A1 | 4/2003 |
| JP | 04089858 | | 10/1993 |
| JP | 93063504 | | 10/1993 |
| JP | 1997-263685 | | 10/1997 |
| JP | 2004-277718 | | 10/2004 |
| WO | 03/002663 | A2 | 1/2003 |
| WO | WO 2004/106405 | * | 12/2004 |
| WO | 2005-040257 | A1 | 5/2005 |
| WO | 2005/063882 | A1 | 7/2005 |
| WO | 2005/071012 | A1 | 8/2005 |
| WO | 2005/114675 | A1 | 12/2005 |

OTHER PUBLICATIONS

IPC-TM-650 Test Methods Manual, 1995, p. 1-3.*
Schiers, John, Modern Polyesters, 2003, Wiley, p. 533.
Stewart, Richard, Automotive Plastics (New Materials and Processing Help OEMs Build Better Vehicles), Plastics Engineering Sep. 10, 2004.
Ticona1, Engineering Polymers for Innovative Application (on line) Feb. 25, 2009.
Ticona2, Product Overview (online) Feb. 25, 2009.
Ticona3, Under the Hood (online) Feb. 25, 2009.

* cited by examiner

*Primary Examiner* — David W Wu
*Assistant Examiner* — Robert Jones, Jr.

(57) ABSTRACT

An article and process for using the article under a high temperature and high humidity condition are disclosed. The article comprises or is produced from polyester, at least one ethylene copolymer, and optionally an additive and includes one or more automobile parts and electronic or electrical connectors. The process comprises employing the composition or an article in a hostile environment including a temperature of 60° C. or higher and a relative humidity of at least 60%.

17 Claims, No Drawings

ARTICLES COMPRISING POLYESTER AND ETHYLENE COPOLYMER

This application is a continuation-in-part of application Ser. No. 11/698,434, filed Jan. 26, 2007, which claims priority to U.S. provisional application Ser. No. 60/764,153 filed Feb. 1, 2006; the entire disclosures of both prior applications are herein incorporated by reference.

The invention relates to articles comprising or produced from polyester such as polybutylene terephthalate and ethylene copolymer such as copolymer of ethylene, butyl acrylate, and glycidyl methacrylate.

Although it is not susceptible to the effect of water and is quite stable at a temperature below 60° C., in a humid and high temperature environment polybutylene terephthalate (PBT) can be hydrolyzed. At high temperature, water or water vapor hydrolyzes the ester bond and forms hydroxyl group and carboxyl group. The carboxyl group and the carboxyl end group on the PBT polymer chain self-catalyzes the reaction and accelerates the hydrolysis. This behavior restricts the use of PBT in a hot and humid environment. For example, trends in the automotive industry are towards higher under-hood temperature and, frequently, with high humidity. Under such conditions the mechanical and electrical properties of PBT can be deteriorated. This is a big problem in using PBT to produce certain articles for use in applications including electronic connectors and auto parts, where the connectors and parts are likely to be used in a humid and high temperature environment. There is a need or desire to produce such articles comprising PBT and ethylene copolymer having improved hydrolytic stability.

SUMMARY OF THE INVENTION

The invention includes an article and use thereof wherein the article can be used under a hostile environment and comprises or is produced from polyester, at least one ethylene copolymer, and optionally an additive. A hostile environment includes high humidity and high temperature.

The invention also includes a process comprising employing a composition or an article in a hostile environment wherein the composition comprises or is produced from polyester, at least one ethylene copolymer, and optionally an additive.

DETAILED DESCRIPTION OF THE INVENTION

A hostile environment refers to high temperature, high humidity, optionally high pressure. A high temperature includes a temperature at least 60° C., 80° C., 100° C., 150° C., 200° C., or 250° C., up to as high as 300° C. or higher. A high humidity includes a relative humidity of at least 50%, 60%, 75%, 80%, 85%, 90%, 95%, or 99% and can be 100% relative humidity.

Polyester is well known to one skilled in the art and can include any condensation polymerization products derived from, by esterification or transesterification, an alcohol and a dicarboxylic acid including ester thereof. Alcohols include glycols having 2 to about 10 carbon atoms such as ethylene glycol, propylene glycol, butylene glycol, propanediol, methoxypolyalkylene glycol, neopentyl glycol, trimethylene glycol, tetramethylene glycol, hexamethylene glycol, diethylene glycol, polyethylene glycol, cyclohexane dimethanol, or combinations of two or more thereof. Dicarboxylic acids include terephthalic acid, succinic acid, adipic acid, azelaic acid, sebacic acid, glutaric acid, isophthalic acid, 1,10-decanedicarboxylic acid, phthalic acid, dodecanedioic acid, ester-forming equivalent (e.g., diester such as dimethylphthalate), or combinations of two or more thereof. Frequently used polyesters include polyethylene terephthalate (PET), polypropylene terephthalate, PBT, polyethylene naphthalene, or combinations of two or more thereof. Because polyester and process therefor are well known to one skilled in the art, the description of which is omitted herein for the interest of brevity.

Polyesters may also be nucleated to improve crystallinity and optical clarity. Suitable nucleation agents include salts of organic acids, such as sodium stearate. Polyesters may also contain inorganic fillers such as glass fibers, talc, and/or other mineral reinforcements to increase the stiffness and heat resistance of the composition, especially for crystalline polyethylene terephthalate.

An ethylene copolymer must include repeat units derived from ethylene and an epoxy comonomer including, for example, glycidyl acrylate, glycidyl methacrylate, glycidyl butyl acrylate, glycidyl vinyl ether, or combinations of two or more thereof. The comonomer may be incorporated into the ethylene copolymer from 0.25 to about 20%, about 0.5 to about 10%, about 0.5 to about 5%, or about 5% to about 12%. For example, the epoxy comonomer can include ethylene alkyl(meth)acrylate copolymer, ethylene acid copolymer, or ionomer of the ethylene acid copolymer. For example, an E/GMA is a copolymer comprising repeat units derived from ethylene and glycidyl methacrylate. An ethylene copolymer containing an epoxy compound can be separated into the following categories. Very high epoxy content contains 10 and above 10%, high epoxy content contains 7 to less than 10%, medium epoxy content contains about 4 to less than about 7%, and low epoxy content contains from 1 to less than 4%, all based on the weight of the ethylene copolymer.

Frequently used ethylene copolymers can further comprise repeat units derived from an ester of unsaturated carboxylic acid including (meth)acrylate or $C_1$ to $C_8$ alkyl(meth)acrylate, or combinations of two or more thereof. "(Meth)acrylate", refers to acrylate, alkyl acrylate, methacrylate, or combinations of two or more thereof. Examples of alkyl acrylates include methyl acrylate, ethyl acrylate and butyl acrylate. For example, "ethylene/methyl acrylate (EMA)" means a copolymer of ethylene and methyl acrylate (MA); "ethylene/ethyl acrylate (EEA)" means a copolymer of ethylene and ethyl acrylate (EA); "ethylene/butyl acrylate (EBA)" means a copolymer of ethylene and butyl acrylate (BA); and includes both n-butyl acrylate and iso-butyl acrylate; and combinations of two or more thereof. The ethylene copolymer may have a melt index (MI) of from about 0.1 to about 100, or about 0.5 to about 20, or about 0.5 to about 10, g/10 min, measured with ASTM D-1238, condition E (190° C., 2160 gram weight).

Alkyl(meth)acrylate comonomer incorporated into ethylene copolymer can vary from 0.01 or 5 up to as high as 40 weight % of the total copolymer or even higher such as from 5 to 30, or 10 to 25, wt %.

The ethylene copolymer can comprise, consist essentially of, or consists of, repeat units derived from ethylene, an ester of unsaturated carboxylic acid, and an epoxy comonomer, as disclosed above.

The ethylene copolymer can also comprise, consist essentially of, or consist of, repeat units derived from ethylene and an epoxy comonomer including, for example, a glycidyl ester of acrylic acid or methacrylic acid, glycidyl vinyl ether, or combinations thereof, and an additional comonomer such as carbon monoxide.

Processes for producing ethylene copolymers are well known to one skilled in the art and their description is omitted herein for the interest of brevity. For example, ethylene/alkyl acrylate copolymers can be produced using either autoclave or tubular reactors. See, e.g., U.S. Pat. Nos. 5,028,674 and 2,897,183. Ethylene copolymer can also be produced using a continuous tubular reactor process to produce "tubular reactor produced" ethylene/alkyl acrylate copolymer, which denotes an ethylene copolymer produced at high pressure and elevated temperature in a tubular reactor wherein the inherent consequences of dissimilar reaction kinetics for the respective ethylene and alkyl acrylate comonomers is alleviated or partially compensated by the intentional introduction of the monomers along the reaction flow path within the tubular reactor. See, e.g., U.S. Pat. Nos. 3,350,372; 3,756,996; and 5,532,066. Tubular reactor produced ethylene/alkyl acrylate copolymers of this nature are commercially available from E. I. du Pont de Nemours and Company (DuPont), Wilmington, Del.

The composition comprising polyester, the ethylene copolymer, and optional additive may include about 0.0001 to about 50 weight % of one or more additives, which are exchangeable with fillers or modifiers, known in the art, for example, glass fiber, antifog agents, plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers, antistatic agents, slip agents, or combinations of two or more thereof.

The composition can include, based on the total weight of the composition, about 10 to about 99.75, about 20 to about 99, about 30 to about 98, or about 40 to about 96 weight % of polyester; about 0.25 to about 15%, about 0.5 to about 10%, about 0.5 to about 7.5%, about 0.5 to about 5%, about 0.5 to about 3 weight %, or about 5% to about 12% of the ethylene copolymer; and about 0.0001 to about 50, about 0.001 to about 40, about 0.01 to about 30, or about 0.1 to about 20 weight % of the additive.

The composition comprising, consisting essentially of, or consisting of, polyester, an ethylene copolymer, and optional an additive can be produced by any means known to one skilled in the art such as for example, dry blending or melt blending, or combinations of two or more thereof.

Two or more ethylene copolymers can be used in the composition. One of the ethylene copolymer comprises repeat units derived from an epoxy comonomer. The other ethylene copolymer can be any known to one skilled in the art such as, for example, ethylene (meth)acrylic acid copolymers or ionomers derived therefrom or ethylene alkyl(meth)acrylate copolymers.

An article made from the composition, preferably can retain at least 50%, 60%, or 70% of the tensile strength after being used or in a hostile environment disclosed above.

The articles can include one or more belts, boards, automobile parts and electronic or electrical connectors; the automobile part includes air bag plug, automobile lighting hardware, auto lamp sockets and bases, auto air intake duct, or combinations of two or more thereof; the electrical or electronic part includes one or more electrical or electronic connectors or capacitors used under the hood of an automobile or electrical relay component, relay base, relay case, ignition system component, or combinations of two or more thereof.

The articles can be produced by any means known to one skilled in the art and the means are omitted herein for the interest of brevity.

The articles can be made according to any methods known to one skilled in the art such as using an injection molding machine or an extrusion process, the feed containing the polyester composition disclosed above can be precompounded to produce pellets of a polyester matrix polymer with a modifier of an ethylene copolymer or a terpolymer disclosed above or a combination thereof. Fillers such as glass fiber and additives can be incorporated into the compounding step as well. The precompounding usually takes place in a twinscrew extruder to obtain a well dispersed morphology. Because the methods for making the articles are well known to one skilled in the art, the description of which is omitted herein for the interest of brevity.

The invention also includes a process comprising employing the composition or the article in a hostile environment. For example, the article can be employed in a car under the hood during operation condition, always at high temperature and frequently at high humidity as disclosed above.

EXAMPLES

The examples are illustrative and are not to be construed as to unduly limit the scope of the invention.

Raw materials used include PBT (Ultradur® B 4500 from BASF), copolymer of ethylene, butyl acrylate, and glycidyl methacrylate (Elvaloy® from DuPont) or ethylene, n-butyl acrylate, and ethylene methyl acrylate as modifier (Elvaloy® from DuPont) and glass fiber (ChopVantage® HP 3790 from PPG).

As shown in Table 1, each sample formulation is composed of 95% of the PBT resin and 5% of one of the ethylene copolymers or terpolymers modifier. The PBT resin and the ethylene copolymer or terpolymer were first compounded and pelletized using a 30 mm twin-screw extruder, the compounded pellets were then fed into an injection molding machine to make sample specimens for tensile strength tests. The sample specimens were subsequently placed in a pressure cooker under 15 psig steam (about 100% relative humidity), 121° C., for 50 hours. Tensile strength was measured on the sample specimens before and after the heat and humid treatment. The testing method was ASTM D638 at 0.2 in/min speed, the thickness of the sample specimen was ⅛ inch.

TABLE 1[1]

| 5% modifier | Tensile Strength (MPa) | | | |
| --- | --- | --- | --- | --- |
| | 0 hours | 50 hours | Retention 1 (%) | Retention 2 (%) |
| None | 51.3 | 14.9 | 29 | 29 |
| ELVALOY ® 4170 | 49.8 | 43.7 | 88 | 85 |
| ELVALOY ® PTW | 48.6 | 44.7 | 92 | 87 |
| ELVALOY ® PT862 | 48.3 | 31.2 | 65 | 61 |
| ELVALOY ® 34035AC | 47.6 | 20.6 | 43 | 40 |
| ELVALOY ® 3135AC | 47 | 20.7 | 44 | 40 |
| ELVALOY ® 1330AC | 46.8 | 24.1 | 51 | 47 |

[1]Tensile strength of PBT with 5% modifier before and after 50 hours treatment at 121° C. and 100% humidity; the values for 0 hours were done before the treatment with heat and humidity; The first column represents PBT compound composition. ELVALOY ® 4170 was an ethylene/n-butyl acrylate/glycidyl methacrylate (E/nBA/GMA) copolymer with high GMA level, DuPont; ELVALOY ® PTW was an ethylene/n-butyl acrylate/glycidyl methacrylate (E/nBA/GMA) copolymer with medium GMA level, DuPont; ELVALOY ® T862 was an ethylene/n-butyl acrylate/glycidyl methacrylate (E/nBA/GMA) copolymer with low GMA level, DuPont; ELVALOY ® 34035AC was an ethylene copolymer comprising 35 wt % butyl acrylate, DuPont; ELVALOY ® 3135AC was an ethylene copolymer comprising 35 wt % butyl acrylate, DuPont; Elvaloy ® 1330AC was an ethylene copolymer comprising 30 wt % methyl acrylate, DuPont; Retention 1 represents retention of tensile strength (%) vs. the same formulation before the treatment; Retention 2 denotes retention of tensile strength(%) vs. PBT before the treatment; and the treatment was carried out in a pressure cooker under 15 psig steam (about 100% relative humidity), 121° C., for 50 hours.

As shown in Table 1, by adding 5% of the modifiers, retention of the tensile strength is significantly improved. Specifically, the EBAGMA modifier Elvaloy 4170 and Elvaloy PTW increased the retention of tensile strength to 85%-92% range from the 29% of the PBT without using the modifier.

In separate runs, retention of impact strength of the PBT compounds were tested at 23° C. after 25 hours and 50 hours hydrolysis treatment disclosed above. The results are shown in Table 2 below.

TABLE 2

| | Notch Izod (ft lb/in) | | | |
|---|---|---|---|---|
| Modifier | 25 hours treatment | Improvement over the unmodified PBT (%) | 50 hours treatment | Improvement over the unmodified PBT (%) |
| None | 0.62 | | 0.27 | |
| ELVALOY ® 4170 (5%) | 0.76 | 23 | 0.42 | 56 |
| ELVALOY ® PTW (5%) | 0.75 | 21 | 0.52 | 93 |

The improvement denotes increase % of Notch Izod impact strength as compared to the impact strength of PBT without modifier under the same treatment; and the treatment was carried out in a pressure cooker under 15 psig steam (about 100% relative humidity), 121° C., for 50 hours.

Table 2 shows that PBT compounds containing as low as 5% EBAGMA modifier with medium level of GMA increases impact strength as much as 93%, as compared to the PBT resin having no modifier under the same treatment.

Table 3 shows the tensile strength test results of the compounded samples with 90% PBT and 10% of the modifier before and after 50 hours treatment in hot and humid condition as shown in Table 3.

Table 3[1]

| | Tensile Strength (MPa) | | | |
|---|---|---|---|---|
| 10 wt % modifier | 0 hours | 50 hours | Retention 1(%) | Retention 2 (%) |
| None | 51.3 | 14.9 | 29 | 29 |
| ELVALOY ® 4170 | 44.8 | 42.3 | 94 | 82 |
| ELVALOY ® PTW | 43.8 | 45.5 | 104 | 89 |
| ELVALOY ® PT862 | 43.1 | 34.8 | 81 | 68 |
| ELVALOY ® 34035AC | 42.8 | 20.7 | 48 | 40 |
| ELVALOY ® 3135AC | 41.7 | 21.9 | 53 | 43 |
| ELVALOY ® 1330AC | 42.1 | 25.0 | 59 | 49 |

[1]See footnotes in Table 1.

As shown in Table 3, with 10% loading, the EBAGMA modifier ELVALOY 4170 and ELVALOY PTW increases the retention of tensile strength as much as 104% from the 29% of the PBT without using the modifier.

Table 4 shows the tensile strength of glass fiber-reinforced PBT with 10% modifier before and after 56 hours treatment in hot and humid condition as disclosed for Table 2. The glass fiber was incorporated during the precompounding step in the Twinscrew extruder.

TABLE 4[1]

| | Tensile Strength (MPa) | | | |
|---|---|---|---|---|
| 10 wt % modifier | 0 hours | 56 hours | Retention 1 (%) | Retention 2 (%) |
| Composition 1 | 122 | 56.7 | 46 | 46 |
| Composition 2 | 101 | 79.2 | 78 | 65 |

[1]Composition 1 was PBT composition comprising 30 wt % glass fiber and no modifier; composition 2 was PBT composition comprised 30 wt % glass fiber and 10% ELVALOY ® 4170; and see footnotes in Table 1.

As shown in Table 4, with 10% EBAGMA modifier the retention of tensile increases up to 78% from the 46% of the glass reinforced PBT without using the modifier.

The invention claimed is:

1. An article comprising or produced from a composition wherein
   the article is selected from the group consisting of one or more belts, boards, air bag plugs, air intake ducts, and electronic or electrical connectors;
   the composition comprises or is produced from polyester, at least one ethylene copolymer, and optionally an additive;
   the polyester includes polyethylene terephthalate, polypropylene terephthalate, polybutylene terephthalate, or combinations of two or more thereof;
   the ethylene copolymer is present in the composition from about 1 to about 3%, based on the weight of the composition;
   the ethylene copolymer comprises repeat units derived from ethylene and a comonomer;
   the comonomer is an epoxy comonomer, an alky (meth) acrylate, or combinations of an epoxy comonomer and an alkyl acrylate; and
   the composition, after being present under a high humidity and high temperature condition for 50 hours, retains at least 50% of the tensile strength.

2. The article of claim 1 wherein the comonomer is the epoxy comonomer, which is glycidyl acrylate, glycidyl methacrylate, glycidyl butyl acrylate, glycidyl vinyl ether, or combinations of two or more thereof.

3. The article of claim 2 wherein the composition further comprises another ethylene copolymer comprising ethylene alkyl(meth)acrylate copolymer, ethylene acid copolymer, or ionomer of the ethylene acid copolymer, or combinations of two or more thereof.

4. The article of claim 2 wherein the comonomer is the combination of the epoxy comonomer and the alkyl acrylate.

5. The article of claim 4 wherein the ethylene copolymer is an ethylene/n-butyl acrylate/glycidyl methacrylate copolymer, an ethylene/n-butyl acrylate/glycidyl acrylate copolymer, an ethylene/n-butyl acrylate/glycidyl butyl acrylate methacrylate copolymer, or combinations of two or more thereof.

6. The article of claim 5 wherein the composition further comprises the additive, which is one or more glass fibers, antifog agents, plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers, antistatic agents, slip agents, or combinations of two or more thereof.

7. The article of claim 1 wherein the comonomer is the alkyl (meth)acrylate, which is butylacrylate or methylacrylate.

8. The article of claim 7 wherein the ethylene copolymer is present in the composition from about 0.25 to about 3%.

9. The article of claim 2, 4, 7, or 8 wherein the article is included in an automobile operating under a high temperature and high humidity condition including a temperature of 60° C. or higher and a relative humidity of at least 60%.

10. A process comprising placing an article in a hostile environment wherein the article comprises or is produced from polyester, an ethylene copolymer, and optionally an additive; and the hostile environment includes a temperature of 60° C. or higher a relative humidity of at least 60% wherein the article is selected from the group consisting of one or more belts, boards, air bag plugs, air intake ducts, and electronic or electrical connectors;

the article has reduced loss in tensile strength as compared to an article that does not contain the ethylene copolymer;

the polyester includes polyethylene terephthalate, polypropylene terephthalate, polybutylene terephthalate, or combinations of two or more thereof;

the ethylene copolymer comprises repeat units derived from ethylene and an alkyl (meth)acrylate comonomer, an epoxy comonomer, or both.

11. The process of claim 10 wherein ethylene copolymer is present in the article from about 3 to about 10%, based on the weight of the article.

12. The process of claim 11 wherein the ethylene copolymer is an ethylene/n-butyl acrylate/glycidyl methacrylate copolymer, an ethylene/n-butyl acrylate/glycidyl acrylate copolymer, an ethylene/n-butyl acrylate/glycidyl butyl acrylate copolymer, an ethylene copolymer comprising butyl acrylate, an ethylene copolymer comprising methyl acrylate, or combinations of two or more thereof.

13. The process of claim 11 wherein the article further comprises one or more glass fibers, antifog agents, plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers, antistatic agents, slip agents, or combinations of two or more thereof.

14. The process of claim 11 wherein the composition, after being present under hostile environment for 50 hours, retains at least 50% of the elongation.

15. The process of claim 14 wherein the ethylene copolymer is a terpolymer of ethylene, butylacrylate, and glycidyl methylacrylate; and the polyester is polybutylene terephthalate.

16. A process comprising placing an article under the hood of an automobile wherein
the article, electrical relay component, electrical relay base, electrical relay case, electrical ignition system component, or combinations of two or more thereof;
the article comprises or is produced from polyester and an ethylene copolymer;
the article has reduced loss in tensile strength as compared to an article that does not contain the ethylene copolymer;
the polyester is polyethylene terephthalate, polypropylene terephthalate, polybutylene terephthalate, or combinations of two or more thereof; and
the ethylene copolymer is present in the article from about 1 to about 3%, based on the weight of the article and is an ethylene and alkyl(meth)acrylate copolymer or an ethylene butylacrylate glycidyl methacrylate terpolymer.

17. The article of claim 16 wherein the ethylene copolymer is present in the article from about 0.25 to about 3%.

* * * * *